United States Patent
Jayasimha et al.

(10) Patent No.: US 11,671,850 B1
(45) Date of Patent: Jun. 6, 2023

(54) ADAPTIVE TAPER SELECTION FOR BEAMFORMING

(71) Applicant: AST & Science, LLC, Miami, FL (US)

(72) Inventors: Sriram Jayasimha, Leicester (GB); Abel Avellan, Coral Gables, FL (US); Huiwen Yao, Potomac, MD (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/696,578

(22) Filed: Mar. 16, 2022

Related U.S. Application Data

(60) Provisional application No. 63/161,726, filed on Mar. 16, 2021.

(51) Int. Cl.

| | |
|---|---|
| *H04W 16/28* | (2009.01) |
| *H01Q 3/30* | (2006.01) |
| *H04B 17/345* | (2015.01) |
| *H04B 7/185* | (2006.01) |
| *H01Q 1/28* | (2006.01) |
| *H04B 7/195* | (2006.01) |

(52) U.S. Cl.
CPC ............ *H04W 16/28* (2013.01); *H01Q 1/288* (2013.01); *H01Q 3/30* (2013.01); *H04B 7/1851* (2013.01); *H04B 17/345* (2015.01); *H04B 7/195* (2013.01)

(58) Field of Classification Search
CPC ....... H04B 7/185–2041; H04B 17/345; H04W 16/28; H01Q 1/288; H01Q 3/30
See application file for complete search history.

(56) References Cited

U.S. PATENT DOCUMENTS

| | | | | |
|---|---|---|---|---|
| 10,666,348 | B1* | 5/2020 | Legare | .................. H01Q 21/22 |
| 10,897,082 | B1* | 1/2021 | Legare | ..................... H01Q 3/40 |
| 2003/0236072 | A1* | 12/2003 | Thomson | ............ H04L 25/0202 455/63.1 |
| 2004/0110467 | A1* | 6/2004 | Wang | ..................... H04B 7/195 455/12.1 |
| 2015/0088279 | A1* | 3/2015 | Miller | .................... G01D 18/00 700/55 |
| 2019/0207676 | A1* | 7/2019 | Noerpel | ............... H04B 7/2041 |
| 2019/0238216 | A1 | 8/2019 | Avellan et al. | |
| 2020/0309892 | A1* | 10/2020 | Miers | ........................ G01S 3/48 |
| 2020/0366237 | A1 | 11/2020 | Hernandez Bahlsen et al. | |

OTHER PUBLICATIONS

D. Zheng, et al., "Adaptive Beamforming for Mobile Satellite Systems Based on User Location/Waveform", ResearchGate, htps://www.researchgate.net/publication/337232539, IEEE, 2019, 7 pgs.

* cited by examiner

*Primary Examiner* — Raymond S Dean
(74) *Attorney, Agent, or Firm* — Botos Churchill IP Law

(57) ABSTRACT

A satellite communication system includes a phased antenna array having a field of view (FoV) and configured to communicate with a plurality of cells in the FoV via a plurality of beams. Each of the plurality of beams is associated with one of the plurality of cells. A phased antenna array is configured to apply adaptive taper selection, based on both the satellite position (in relation to a satellite service beam) and its surrounding interference scenario.

17 Claims, 14 Drawing Sheets

| Case | BB1 Low band | |
|---|---|---|
| | Nadir 12-bit fixed point taper | 45° ground elevation 12-bit fixed point taper |
| Chebyshev sub-aperture | 411 | 413 |
| Kaiser sub-aperture | 412 | 414 |
| Chebyshev aperture | 421 | 423 |
| Kaiser aperture | 422 | 424 |
| Beam locations in FoV | 431 | 432 |

Downlink: Chebyshev sub-aperture, Kaiser sub-aperture
Uplink: Chebyshev aperture, Kaiser aperture

ADAPTIVE TAPER SELECTION FOR BEAMFORMING

CROSS-REFERENCE TO RELATED APPLICATIONS

The present application claims priority to U.S. Provisional Application No. 63/161,726, filed Mar. 16, 2021, the contents of which are hereby incorporated in their entirety.

BACKGROUND

A low-Earth orbit (LEO) satellite constellation provides global coverage including coverage to ordinary mobile phones (UEs in 4G) that are outside the coverage area of terrestrial cell towers (including oceans). One of the limitations of a downlink's beam power from a space-based phased-array is the maximum power of any given antenna element. This implies that the peak-to-average power ratio (PAPR), across antenna elements, must be minimized. Uplink beamforming is not so constrained—i.e., sub-aperture extent and position are unimportant. In a non-adaptive approach, beam taper is solely based on the satellite position in relation to a satellite service beam.

SUMMARY

In the first aspect of the present disclosure, a PAPR minimizing sub-aperture placement approach is described.

In the second aspect of the present disclosure, a phased array is configured to apply adaptive taper selection, based on both relative position between the satellite and a satellite service beam) and the surrounding interference scenario of the satellite service beam.

BRIEF DESCRIPTION OF THE FIGURES

FIG. 4 illustrates downlink and uplink beam apertures with 12-bit fixed-point tapers.

DETAILED DESCRIPTION

U.S. Patent Application Publication Number 2019/0238216 discloses system and method for high throughput fractionated satellites (htfs) for direct connectivity to and from end user devices and terminals using flight formations of small or very small satellites, the content of which is hereby incorporated by reference in its entirety. U.S. Patent Application Publication Number 2020/0366237 discloses solar, electronic, rf radiator for a self-contained structure for space application array, the content of which is hereby incorporated by reference in its entirety.

Figure 1A:
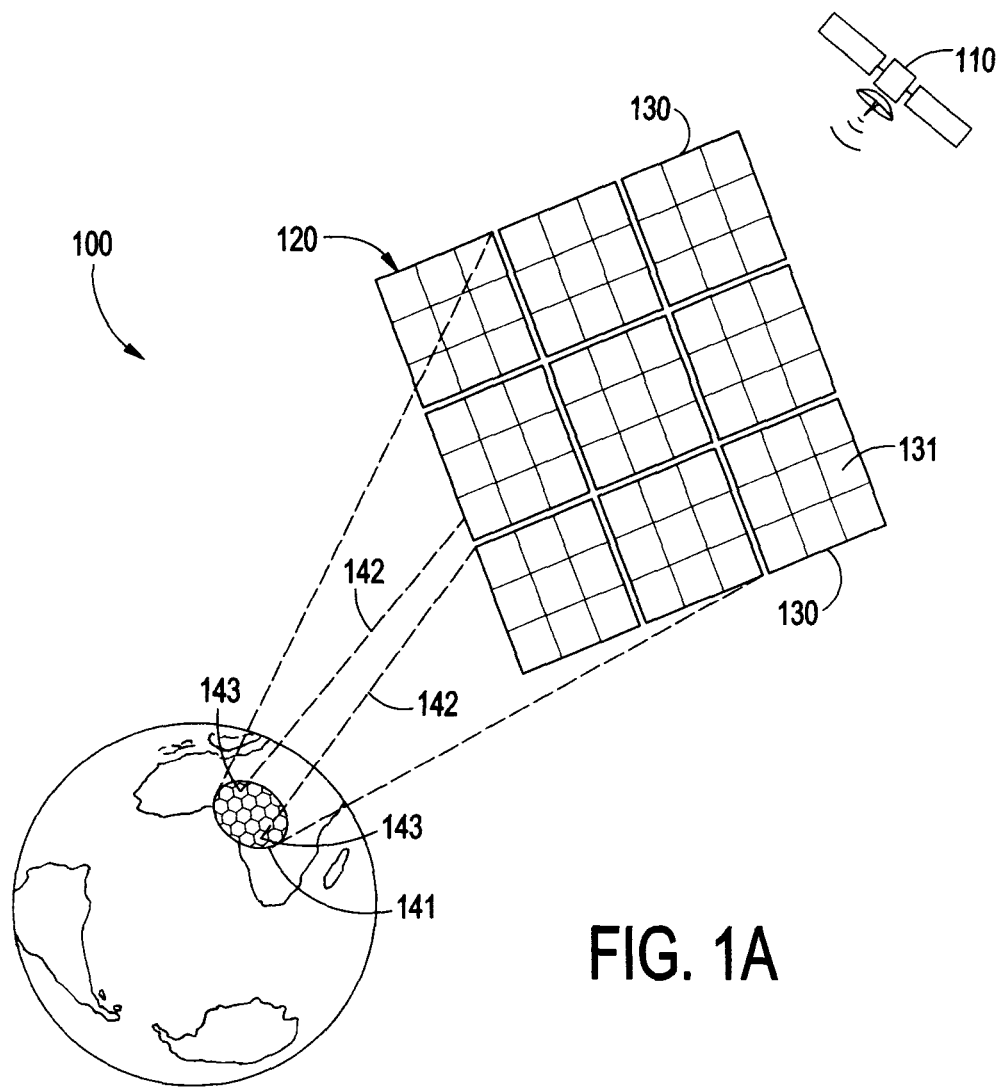
FIG. 1A illustrates the satellite communication system 100 according to one example.

FIG. 1A illustrates the satellite communication system 100 according to one example. The satellite communication system 100 includes a control satellite 110 and a satellite phased antenna array 120. The phased array 120 includes a plurality of antenna assemblies 130, which can also be referred to as "Microns." An antenna assembly 130 can include an array of (or a plurality of) antenna elements 131.

The satellite phased array 120 has a field of view (FoV) 141, and has a plurality of service beams 142 and a plurality of cells 143 in the field of view (FoV) 141. A service beam 142 is between a cell 143 and the satellite phased array 120, and thus, corresponds to the cell 143. Service beam 142 can have uplink beam and downlink beam. Signals transmitted via service beams 142 can include uplink signals from a wireless device (such as mobile user equipment) in a cell to the satellite phased array 120, and downlink signals from the satellite phased array 120 to a wireless device in a cell.

Figure 1B:
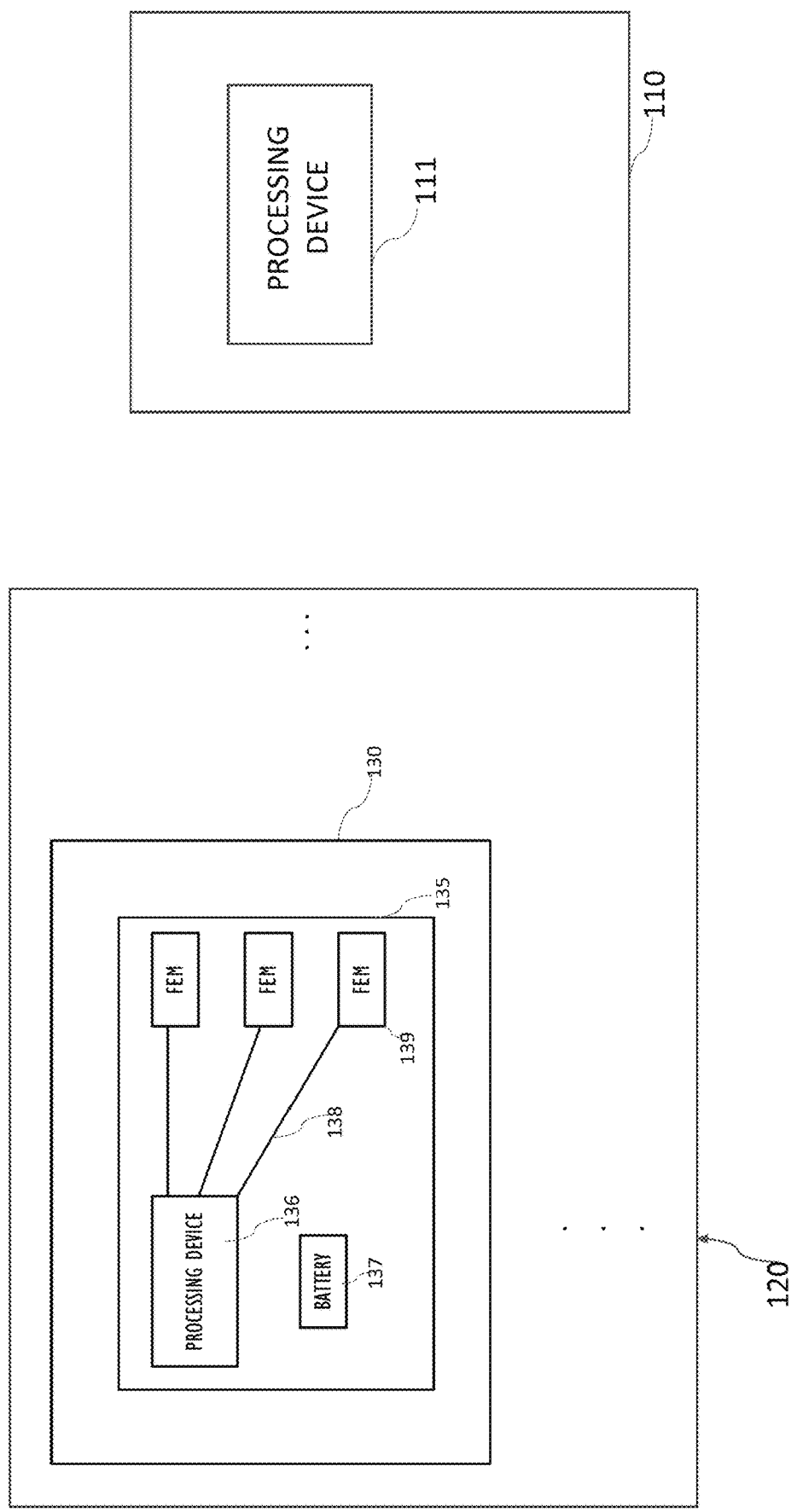
FIG. 1B illustrates a block diagram of example phased antenna array and control satellite.

FIG. 1B illustrates a block diagram of example phased antenna array and control satellite. The phased antenna array 120 include a plurality of antenna assembly 130. The antenna assembly 130 includes a component assembly 135, and other suitable parts such as antennas of antenna elements 131 (FIG. 1A). The component assembly 135 can include, for example, one or more processing devices 136, a battery 137, wires or cables 138, and Front-End Modules (FEMs) 139. The controller satellite 110 can include one or more processing devices 111 (such as a central controller or a central processing unit) configured to communicate with the phased antenna array 120, and/or control operation of the phased antenna array 120.

Uplink (UL, which denotes communications from UEs to satellites) taper and downlink (DL, which denotes communications from satellites to UEs) taper are considered separately (as the objectives are different in the two cases). Specifically, (1) UL taper attempts to minimize or reduce interference (from other than the target UEs in the FOV) to a satellite beam that covers the targeted cell (e.g., akin to a 48 km cell in low-band LTE). and (2) DL taper attempts to minimize or reduce interference (to UEs) to terrestrially covered cells and inter-beam interference, while minimizing or reducing the peak-to-average-power (PAPR) in the elements of the phased array antenna (by sub-aperture selection).

Two extreme or example UL/DL scenarios may arise. (1) service beams are nearby cells that are covered by terrestrial base-stations; and (2) remote service beams are in a region where terrestrial coverage is very sparse.

Taper selection in these two service beam cases will be determined by the serving satellite position in relation to them, and satellite positions in-between these two extreme or example scenarios (in relation to a service beam) and terrestrial interference that are in-between being nearby and remote may be addressed by a more complex decision table. Each service beam's taper can be determined independently from the other service beams.

Figure 2:
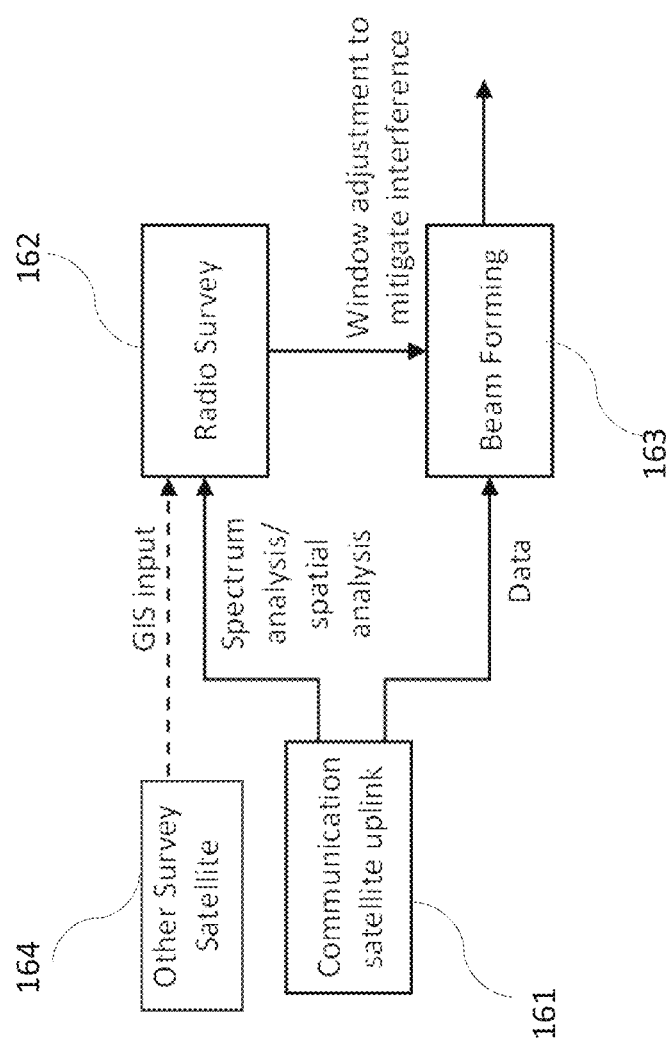
FIG. 2 illustrates schematic for window adjustment to mitigate uplink interference

FIG. 2 illustrates schematic for window adjustment to mitigate uplink interference. Via communication satellite uplink 161, spectrum analysis and spatial analysis are performed for radio survey 162, and geographic information system (GIS) input can also be provided from other survey satellite 164 (other than the controller satellite 110 and satellite phased array 120 in FIG. 1A). According to the radio survey, window adjustment on the beam-former 163 mitigates sources of interference.

Terrestrial interference (which could have cyclical patterns that change, hourly, daily, weekly, or seasonally that is superposed on a secular growth trend) could be mapped by satellite-constellation wide "learning" system (that is distinct from its main LTE communications relay mission).

UL Adaptive Taper

Simplified (extreme satellite positions) UL scenarios are presented in Table 1. More details and justification of such an approach are given in Part "Full aperture and taper selection for receive beamformer" below.

TABLE 1

Simplified UL taper selection

| Relative position between Satellite and service cell | Service Beam Type (or Service cell type) | |
|---|---|---|
| | Nearby to terrestrial cells | Remote from terrestrial cells (with, perhaps, dense distribution) |
| Near-nadir | Chebyshev taper (full aperture) (e.g., with −55 dB SLL) | Kaiser taper (full aperture) |
| Near-edge of FOV | Chebyshev taper (full aperture) (e.g., with −32 dB SLL) | Rectangular taper (full aperture) |

DL Taper

In the DL, the aperture used in each beam is also selected so that the PAPR of elements of the phased array antenna. In other words, there is both an aperture and taper selection strategy. Omitting details of sub-aperture selection, simplified (extreme satellite positions) DL scenarios are presented in Table 2. Referring to Table 2, when the service cell is near nadir of FoV of satellite, for the DL beam, Chebyshev taper is selected when the service beam is nearby to terrestrial cells, but Kaiser taper is selected when the service beam is remote from terrestrial cells, because interference to remote regions are suppressed. When the service cell is near edge of FOV, for the DL beam, Chebyshev taper is selected when the service beam is nearby to terrestrial cells (because interference in nearby regions must be suppressed), and rectangular taper is selected when the service beam is remote from terrestrial cells, because interference to nearby terrestrial regions can be tolerated, while interference to terrestrial cells in remote regions must be suppressed. It should be noted these are general guidelines in the absence of ITU regulations for regions without terrestrial service. In practice, ITU or country-specific regulations will limit the application of these guidelines.

TABLE 2

Simplified DL taper selection

| Relative position | Service Beam Type | |
|---|---|---|
| between Satellite and service cell | Nearby to terrestrial cells | Remote from terrestrial cells |
| Near-nadir | Chebyshev taper with sub-aperture selection | Kaiser taper with sub-aperture selection |
| Near edge of FOV | Chebyshev taper (full aperture) | Rectangular taper (full aperture) |

There are several differences between UL and DL, which includes:
1. UL has interference from terrestrial and satellite cells, while DL creates interference to terrestrial and satellite cells
2. UL tapers can occupy the whole aperture (if desired) to suppress interference from terrestrial regions, while DL uses sub-aperture selection to minimize PAPR, while selecting taper that minimizes interference to terrestrial regions.
3. It is important not to enlarge edge-of-FOV beams in DL (that reduce beam directivity). A rectangular taper can help achieve this.

Radio Survey

UHF monitoring from space was reported and is useful in observing LTE (low-band) emissions (e.g., SMOG-1 and Hawkeye-360). Because the satellite receiver of SMOG-1 measures and integrates all range-attenuated emissions over a very wide field of view (FOV, that exceeds 3500 km diameter at 400 km altitude), any snapshot cannot, by itself, be used to obtain the distribution of emissions' variations over the FOV (and therefrom, determine taper selection). Hawkeye-360 has recently launched three satellites in flight formation to geolocate sources of RF emissions from 144 Mhz-15 GHz (called RFGEO).

An 8 m aperture, 700 km altitude, satellite is due to be launched late in 2021, which can, in addition to its main mission, serve to map UHF emissions to a 48 km diameter resolution (when the surveyed sites, at any given time, are roughly satellite nadir). The longest duration re-visit time (with and roughly at same time of day) is estimated at about 4 weeks. With a 105-satellite 7-plane polar constellation, revisits occur twice daily at the same place (within a distance threshold of ±100 km from the satellite nadir and within 2 hours. Thus, this allows a global "heat-map" of emissions by two-hour time-durations. Weekly and seasonal variations can also be captured as well as longer-term trends.

Emitter Distribution in the FOV

A simple interference model is a uniform distribution of equal-strength emitters in a "flat" FOV (the ungula, or spherical wedge, can be approximated by a flat surface when the satellite altitude is small) of radius R. The probability density function for such a distribution $f(r)=r/(\pi R^2)$. An emitter at radius r is received in the ratio of $a^2/(a^2+r^2)$ at the altitude a satellite. The total receiver interference level, for a FOV of radius R, normalized to the received signal strength at the satellite from a nadir emitter, is then:

$$I(R) = \int_0^R \frac{r}{\pi R^2} \frac{a^2}{a^2 + r^2} dr = \frac{a^2}{2\pi R^2} \ln \frac{a^2 + R^2}{a^2}$$

This expression can be further simplified as the FOV radius R is function of a and the radius of the Earth $R_e$. However, there are other likely emitter distributions, such as ones with local interference only, ones with far interference only such as Brazil and Russia for which we can optimize the choice of window. For example, with Fiji at nadir and a service beam targeting Fiji, there are nearby terrestrial interferers to the service beam targeting Fiji. With target cells near the centers of Brazil and Russia, interferers at the FOV edge predominate.

Full Aperture and Taper Selection for Receive Beamformer

One of the objects of a space-based cellular broadband network that can be accessed by standard smartphones is to serve remote areas where, typically, population density is low (and capital expenditure for terrestrial base-stations is not justified in relation to the operating revenues generated by them). These locations could have local or far terrestrial emitters in the band of interest. Referring to Table 1, when the service cell is near nadir of FoV of satellite, for the UL beam, Chebyshev taper is selected when the service beam is nearby to terrestrial cells to suppress interference from the nearby terrestrial cells, but Kaiser taper is selected when the service beam is remote from terrestrial cells, to suppress the interference from the remote terrestrial cells. When the service cell is near edge of FOV, for the UL beam, Chebyshev taper is selected when the service beam is nearby to terrestrial cells (because interference in nearby regions need to be suppressed), and rectangular taper is selected when the service beam is remote from terrestrial cells, to suppress the interference from the remote terrestrial cells. Rectangular taper has higher sidelobes (causing interference from other cells) than Chebyshev taper, the higher sidelobes can cause or increase interference from other beams. The Kaiser window approximates the discrete prolate spheroidal sequences (DPSS), which maximize power within a given beamwidth (here, ±24 km in LTE low-band at 700 km altitude). In the UL, the entire aperture is used for all beams in the FoV (unlike DL, where element PAPR minimization—across array elements—uses partial apertures for different beams; for PAPR minimization or reduction, sub-apertures for near-nadir beams are positioned to the edge of the phased array aperture). As illustrated in FIG. 4, the DL sub-apertures are shifted to the edge of the phased-array aperture. Each individual beam 142 of the phased antenna array 120 can have its own taper, and multiple beams 142 of the phased antenna array 120 can have simultaneously have different tapers.

The throughput one can have on UL depends on the signal-to-interference (plus noise) ratio. At the edge of the FOV (for a reasonably economical overall aperture), we can enhance signal power by using rectangular window (compared to Kaiser). Kaiser and Chebyshev suppress the SLL differently (far in the case of Kaiser and nearby in the case of Chebyshev). Since the gain of Rectangular in signal strength more than offsets interference suppression of Kaiser (for distant interference), we select Rectangular when interference is distant.

Given sufficient aperture, we can a) always form circular cells over the entire FOV and b) get whatever interference suppression (SLL) we desire using either Chebyshev or Kaiser windows. So, the "nearby" and "distant" definition depends on the aperture size (altitude and, thereby, FOV being assumed constant). So, with a sufficiently large aperture, we can get approximately the same signal-to-interference ratio for any beam entire FOV. With a smaller aperture, the beams become elliptical once the distance exceeds an aperture-determined threshold. Also, the interference suppression characteristics change depending on the window. So, for example, we select rectangular for distant terrestrial cells (in order to minimize the beam-width), while at the same time generating/receiving interference to nearby regions (where we don't care as there are no terrestrial cells nearby), and also suppressing interference to distant cells (that have terrestrial cells). Accordingly, for example, when a satellite altitude is 700 km, for a 50 m aperture, the entire FOV will be at nadir or near nadir; whereas for a 25 m aperture, 25-145 degrees for the satellite to Earth may be nadir or near nadir; and for a 15 m aperture, about 85-95 degrees for the satellite to Earth may be nadir or near nadir.

Figure 3A:
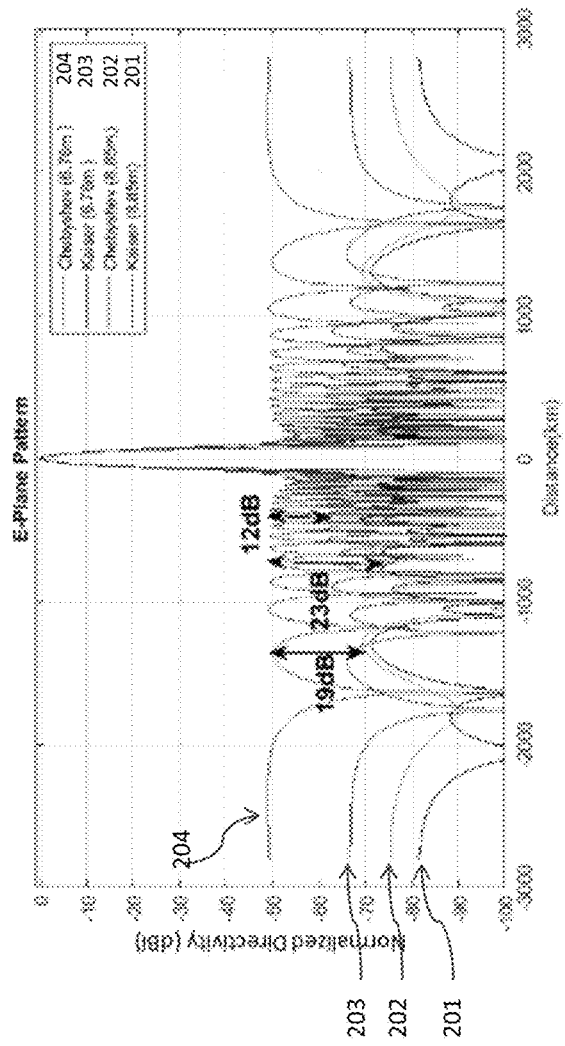
FIG. 3A illustrates E-plane pattern with directivity as a function of distance, with various tapers and apertures, for a nadir beam.
Figure 3B:
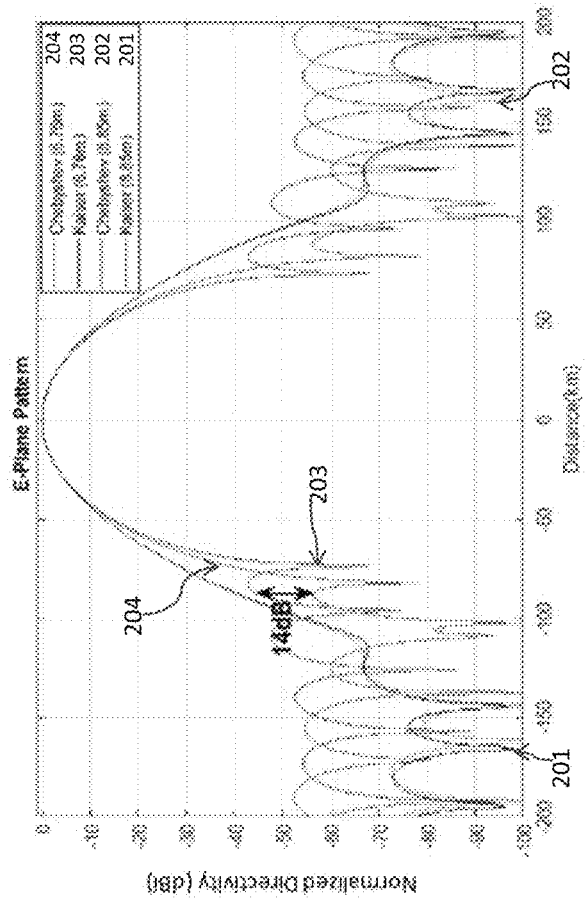
FIG. 3B illustrates a zoom-in view of E-plane pattern of FIG. 3A.

FIG. 3A illustrates E-plane pattern with directivity as a function of distance, with various tapers and apertures, for a nadir beam; and FIG. 3B illustrates a zoom-in view (in 400 km range) of E-plane pattern of FIG. 3A, where tapers are 12-bit fixed point tapers. Curve 201 corresponds to Kaiser taper (or Kaiser window), full aperture of 8.85 meters and sidelobe level (SLL) at −72.87 dB; curve 202 corresponds to Chebyshev taper, full aperture of 8.85 meters, and SLL at −76.0 dB; curve 203 corresponds to Kaiser taper, sub-aperture of 6.76 meters, and SLL at −61.2 dB; and curve 204 corresponds to Chebyshev taper, sub-aperture of 6.76 meters, and SLL at −55 dB. Comparison between curve 202 and curve 204 of FIG. 3A illustrates that improvement in side-lobe level due to using full aperture is up to 23 dB Comparison between curve 203 and curve 204 of FIG. 3A illustrates that the sidelobe level improvement due to Kaiser window is up to 12 dB on remote (>400 km) interferers. However, comparison between curve 203 and curve 204 of FIG. 3B shows that Kaiser window degrades near interferer suppression by ~14 dB. FIGS. 3A to 3D show both directivity (in the main lobe) and SLL (in the side lobe).

FIGS. 3A and 3B show that the response with 6.76 m sub-aperture (in a 23 m full aperture) to maintain a 48 km nadir beam with full/partial aperture and Chebyshev vs. Kaiser taper Interference suppression of remote interferers can be as much as 12 dB due to Kaiser taper; however, this is at expense of nearby interferer suppression.

Figure 3C:
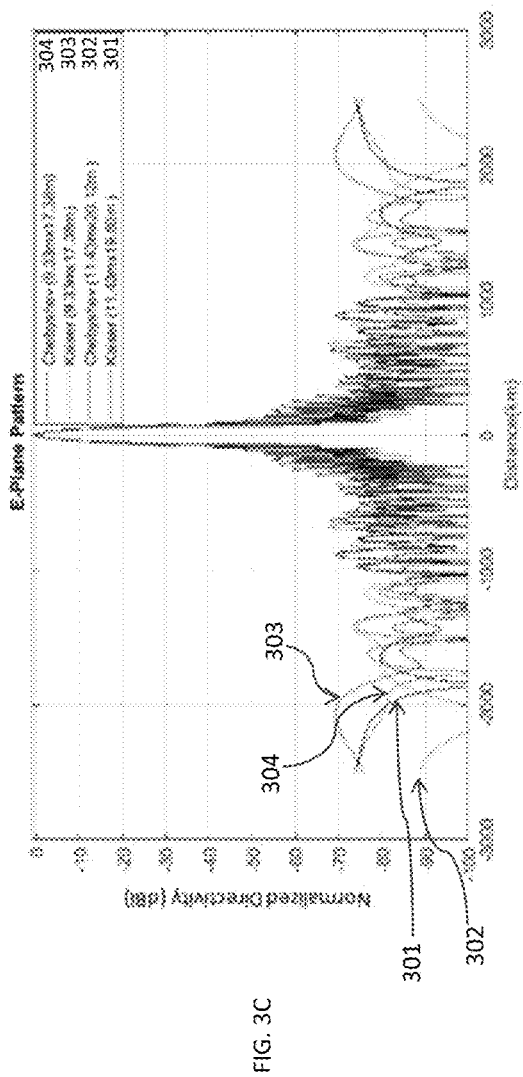
FIG. 3C illustrates E-plane pattern with directivity as a function of distance, with various tapers and apertures, for 45° ground elevation beam.
Figure 3D:
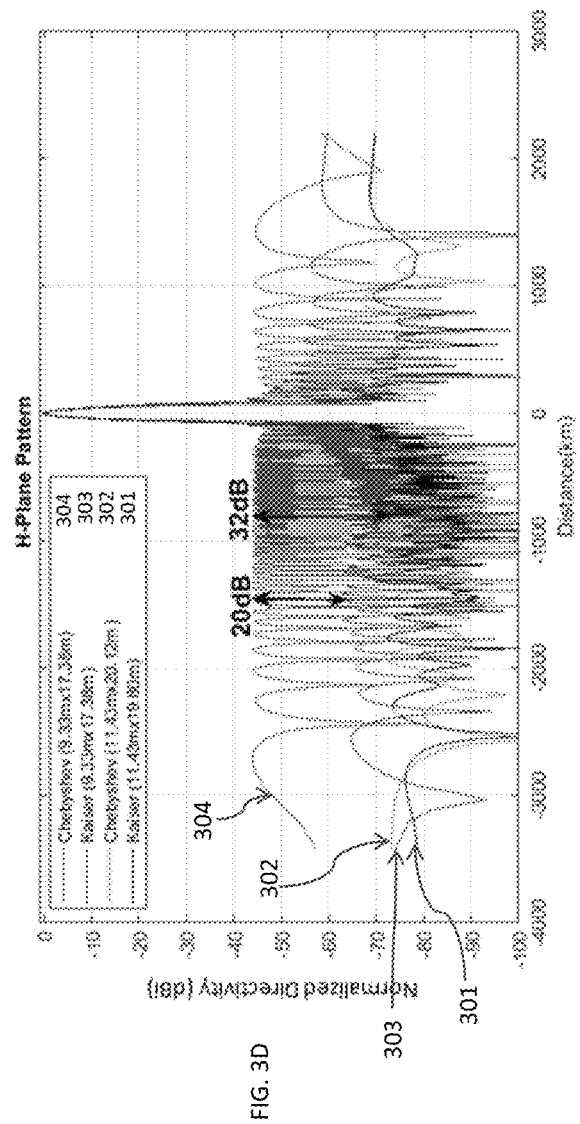
FIG. 3D illustrates H-plane pattern with directivity as a function of distance, with various tapers and apertures, for 45° ground elevation beam.

Similar responses for 45° ground elevation beam is shown in FIGS. 3C and 3D. FIG. 3C illustrates E-plane pattern with gain as a function of distance, with various tapers and apertures, for 45° ground elevation beam; and FIG. 3D illustrates H-plane pattern with gain as a function of distance, with various tapers and apertures, for 45° ground elevation beam. In FIGS. 3C and 3D, tapers are 12-bit fixed point tapers.

Referring to FIGS. 3C and 3D, curve 301 corresponds to Kaiser taper, full aperture of 11.43 m (meters)×19.80 m, and SLL at −78 dB; curve 302 corresponds to Chebyshev taper, full aperture of 11.43 m×20.12 m, and SLL at −73 dB; curve 303 corresponds to Kaiser taper, sub-aperture of 9.33 m×17.38 m, and SLL at −73 dB; and curve 304 corresponds to Chebyshev taper, sub-aperture of 9.33 m×17.38 m, and SLL at −55 dB. Comparison between curves 302 and 304 in FIG. 3D shows that SLL improvement due to using full aperture is up to 32 dB at 600 km Comparison between curves 303 and 304 shows that improvement due to Kaiser window is up to 20 dB on far interference, where the gain on far (>1000 km) interference is reduced by, e.g., 20 dB in curve 303 as compared to curve 304; however, the Kaiser window degrades near interferer suppression by ~15 dB.

FIG. 4 illustrates DL and UL beam apertures with 12-bit fixed-point tapers. For the actual apertures used, as shown in FIG. 4, the smaller sub-apertures 411 to 414 are used for DL, as compared to larger apertures 421 to 424 being used for UL. Fixed-point representation reduces UL beams apertures from full apertures. Although we may desire to use full apertures for UL, the tapers 421 to 424 for UL shown in FIG. 4 round to zero at corners and edges, yielding somewhat reduced apertures (but still larger than the DL apertures 411 to 414). UL apertures used for 45° ground elevation beams are larger than those used for nadir beams. For example, taper 413 is larger than taper 411, and taper 423 is larger than taper 421. Beam 431 is at nadir beam in FoV, and beam 432 is 45° ground elevation beam in FoV.

Generalization of Chebyshev and Kaiser Taper

Figure 5:
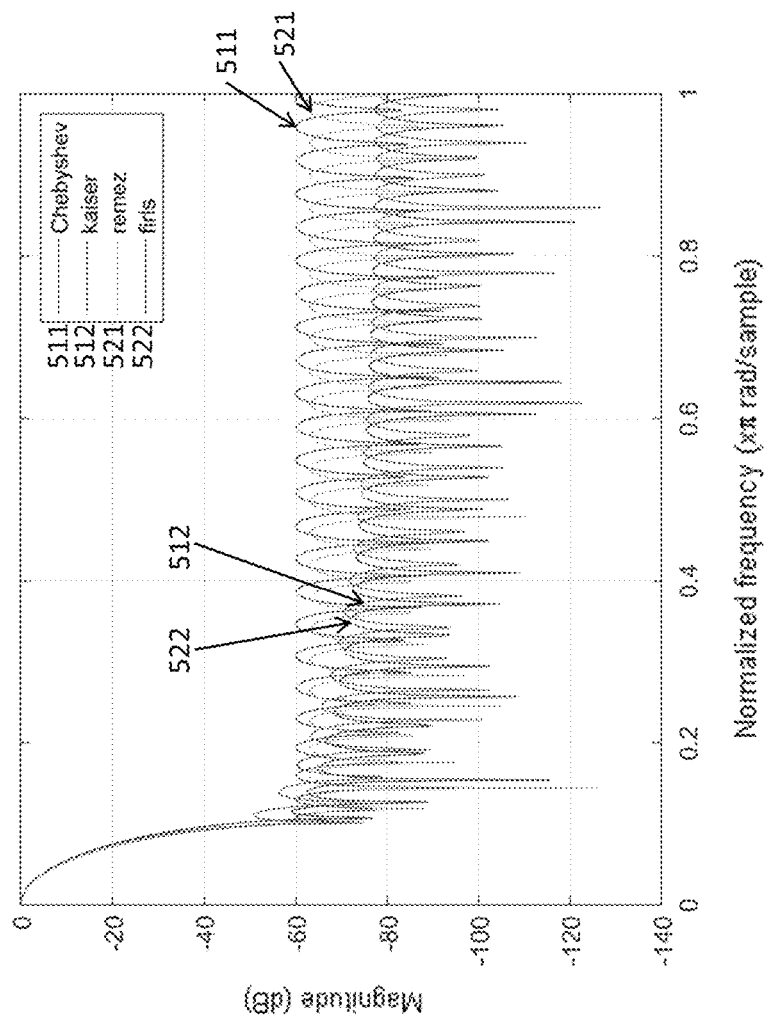
FIG. 5 illustrates, by weighting bands, the Remez exchange and Least-squares designs improve Chebyshev and Kaiser windows, respectively, in the stopband.

The generalization of Chebyshev taper can be made via the Parks-McClellan (Remez exchange) process (where we can specify a main-lobe ripple, transition-width in addition to SLL). The generalization of the Kaiser taper (with similar added specifications) can be made via a least squares design. These two design procedures can (1) weight the bands to get more stopband suppression; and (2) allow multiband designs that can provide a varying degree of suppression. FIG. 5 illustrates, by weighting bands, the Remez exchange and Least-squares designs improve Chebyshev and Kaiser windows, respectively, in the stopband. Curve 511 illustrates magnitude as a function of frequency with Chebyshev taper; and curve 521 illustrates magnitude as a function of frequency with generalization of Chebyshev taper by Remez exchange. Referring to FIG. 5, by applying Remez exchange, SLL is improved by 5 dB (curve 521 as compared to curve 511). That is, the magnitude of SLL is reduced by 5 dB (curve 521 as compared to curve 511). Curve 512 illustrates magnitude as a function of frequency with Kaiser taper; and curve 522 illustrates magnitude as a function of frequency with generalization of Kaiser taper by a least-squares design. Referring to FIG. 5, by applying a least squares design, SLL magnitude is almost identical for curve 522 as compared to curve 512.

Figure 6:
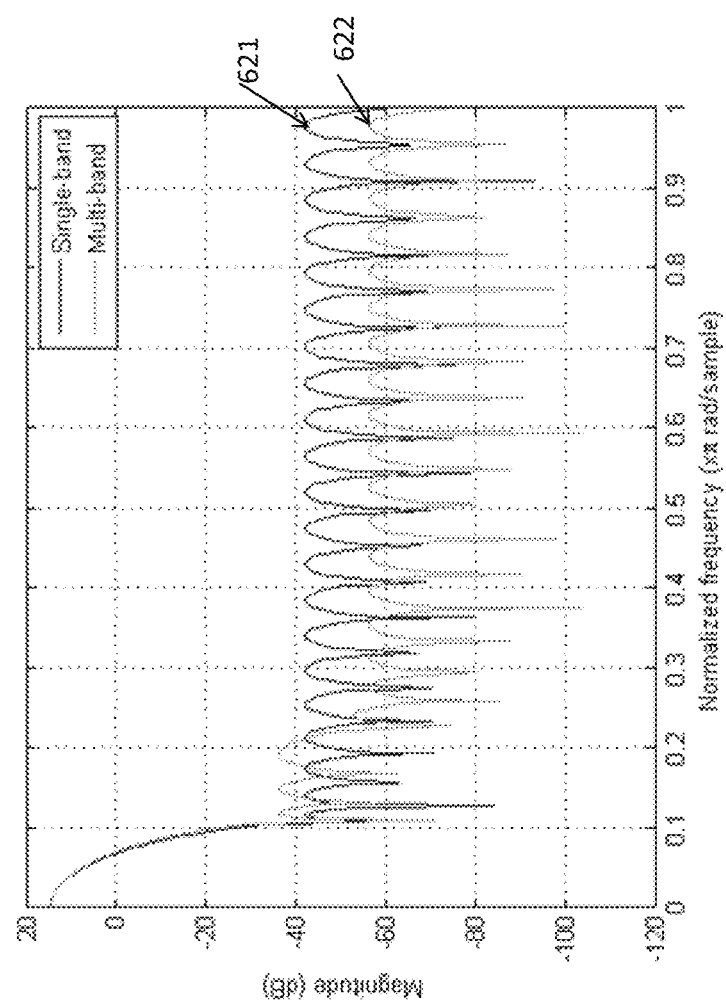
FIG. 6 illustrates by creating multiple stopbands and weighting them, the Remez exchange can improve suppression at the FOV edge at the expense of nearby suppression.

FIG. 6 illustrates by creating multiple stopbands and weighting them, the Remez exchange can improve suppression at the FOV edge at the expense of nearby suppression. Curve 621 illustrates magnitude as a function of frequency for single stopband with Remez exchange; and curve 622 illustrates magnitude as a function of frequency for multiple stopbands with Remez exchange. Magnitude for normalized frequency larger than 0.21 is decreased in curve 622 for multiple band as compared to curve 621 for single band, the main difference being the location of nulls. Multi-stopbands designs can be done (or performed) in both Remez Exchange and least squares design.

Effect of Calibration Errors on Stopband Suppression

Figure 7:
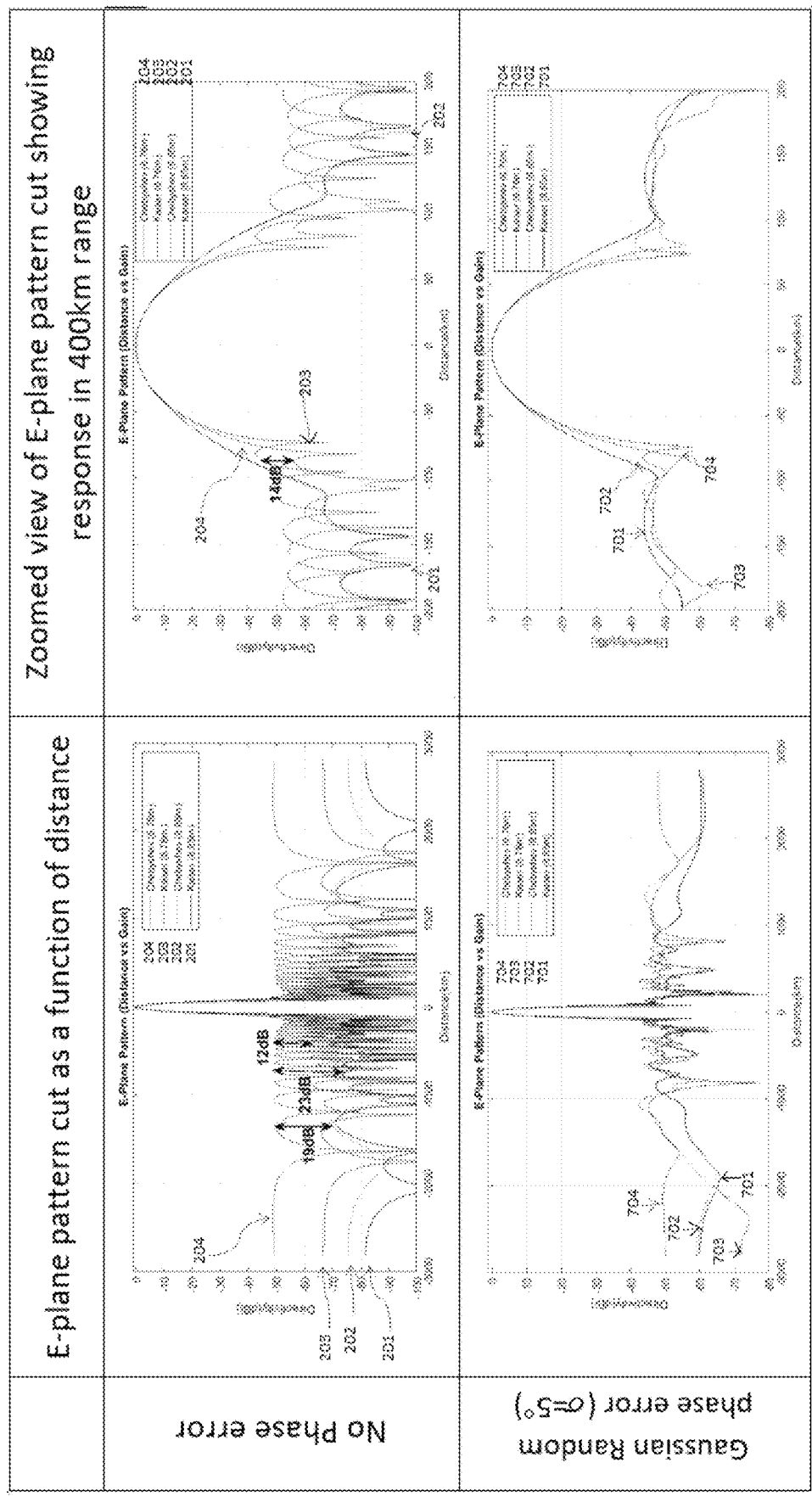
FIG. 7 illustrates responses of 12-bit taper of 6.76 m and 8.85 m sub-apertures (of BB1 of low band) for 48 km nadir beam for no phase error and for phase error standard deviation $\sigma=5°$.
Figure 8:
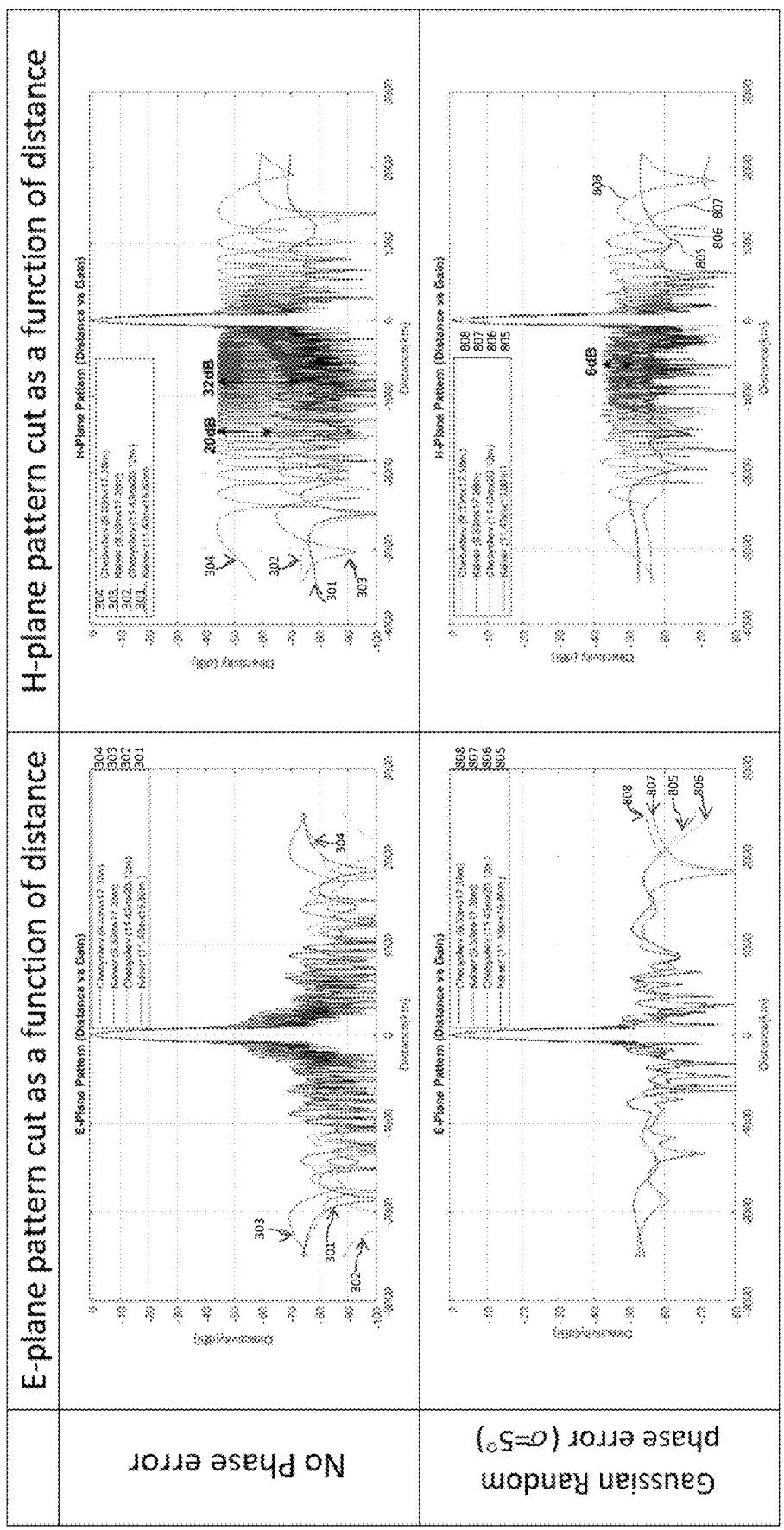
FIG. 8 illustrates responses of 12-bit taper of 9.3 m×17.4 m and 11.4 m×20 m sub-apertures (of BB1 of low band) for 48 km beam 45° ground elevation beam, for no phase error and for phase error standard deviation $\sigma=5°$.

Phased arrays antennas cannot be perfectly phase and amplitude calibrated. Referring to FIG. 7 and FIG. 8, when standard deviation, $\sigma=5°$, random Gaussian distributed phase errors are introduced, there is no improvement of suppression for off-angles for nadir beam (FIG. 7), but only a small improvement (up to 6 dB) for a 45° from boresight beam (FIG. 8). Thus, unless the phased array can be calibrated well enough, none of the gains predicted in sections D and E can be realized. Nevertheless, 6 dB is worthwhile in some far interference scenarios.

FIG. 7 illustrates responses of 12-bit taper of 6.76 m sub-aperture and 8.85 m sub-aperture (of a larger aperture satellite than that considered earlier) for 48 km nadir beam for no phase error and for phase error standard deviation $\sigma=5°$. Curves 201 to 204 correspond to no phase error. Curves 701 to 704 correspond to for phase error standard deviation $\sigma=5°$. As shown in Curves 701 to 704, there is no improvement in sidelobe suppression when phase error standard deviation, $\sigma=5°$. FIG. 8 illustrates responses of 12-bit taper of 9.3 m×17.4 m sub-aperture and about 11.4 m×20 m (11.43 m×20.12 m or 11.43 m×19.80 m) sub-apertures (of BB1 of low band) for 48 km beam 45° ground elevation beam, for no phase error and for phase error standard deviation $\sigma=5°$. Curves 301 to 304 in FIG. 8 (top left and top right) correspond to no phase error. Curves 805 to 808 in FIG. 8 (bottom left and bottom right) correspond to phase error standard deviation $\sigma=5°$. Sidelobes of all the 4 curves in (FIG. 8, bottom left) look similar for E-plane, while in H-plane in FIG. 8 (bottom right), curve 807 corresponding to Kaiser window shows up to 6 dB improvement (i.e., directivity being reduced by 6 dB), as compared to curve 808 corresponding to Chebyshev taper.

DL Sub-Aperture Selection to Minimize PAPR

Figure 9:
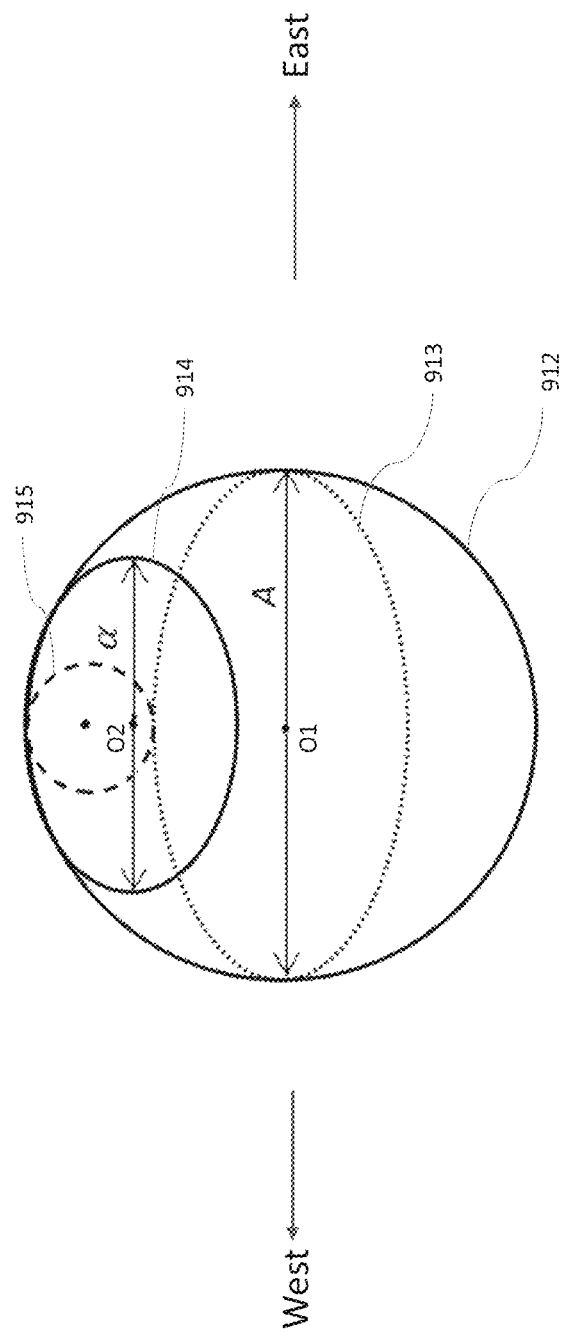
FIG. 9 illustrates example aperture and sub-apertures.

FIG. 9 illustrates example aperture and sub-apertures, where the cell direction is either due west or east of the circular aperture, where the cell direction refers to the direction of the projection of the vector (from the satellite to the cell) onto the planar antenna array. For an example circular overall aperture, an explicit (and optimum or suitable) aperture assignment, that minimizes (or reduces) the maximum power of any element of the array, is to select an ellipse with the major axis pointing to the cell direction (to combat the cosine loss) and the minor axis equal to the diameter of the aperture needed to make the required circular cell on the Earth. Referring to FIG. 9, the space-based planar phased antenna array 912 has a diameter A, and thus a radius A/2. There may be other considering a planar aperture such as, e.g., due to shadowing of the solar panels attached to the obverse of the communication aperture. In some examples, for a range factor of 2 from nadir to the edge of the FOV, varying elliptical sub apertures are used. Sub-apertures 913, 914, 915 each have a major axis $\alpha$, pointing towards the cell, in order for the beam to illuminate the cell, where a major axis $\alpha$ ranges between A/4 to A. For example, the major axis $\alpha$ of the sub-apertures 913 is equal to A, the major axis $\alpha$ of the sub-apertures 914 is equal to A/2, and the major axis $\alpha$ of the sub-apertures 915 is equal to A/4. The minor axis of the sub-aperture ranges between A/4 to A/2. For example, the minor axis of the sub-aperture 915 is equal A/4; and the minor axis of the sub-aperture 913 is equal A/2. In certain examples, for nadir beams, the sub aperture used may be circular. Major axis $\alpha$ of elliptical sub-apertures (such as 913, 914, 915) point in the direction of the cell, and elliptical sub-apertures are tangential to the overall aperture 912. In the example of FIG. 9, near-boresight sub-aperture 915 is near-circular.

Figure 10B:
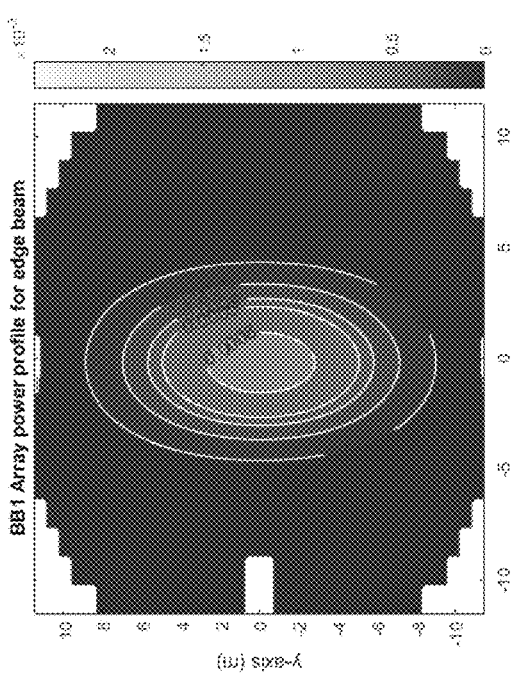
FIG. 10B illustrates array power profile for edge beam.
Figure 10D:
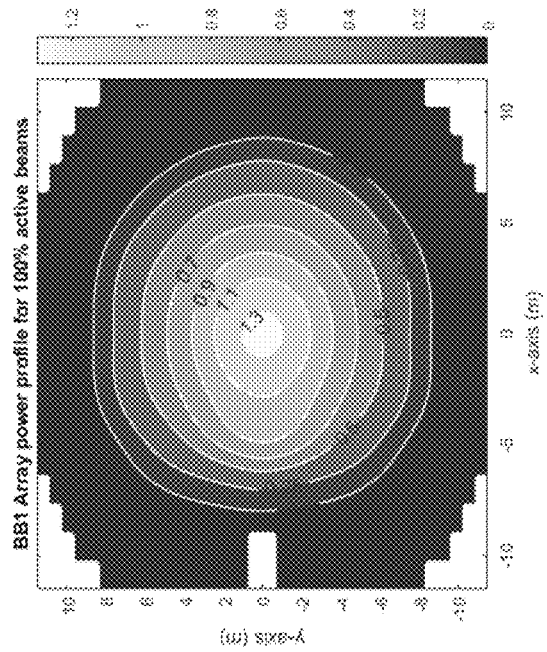
FIG. 10D illustrates array power profile for 100% active beams in FOV.
Figure 10A:
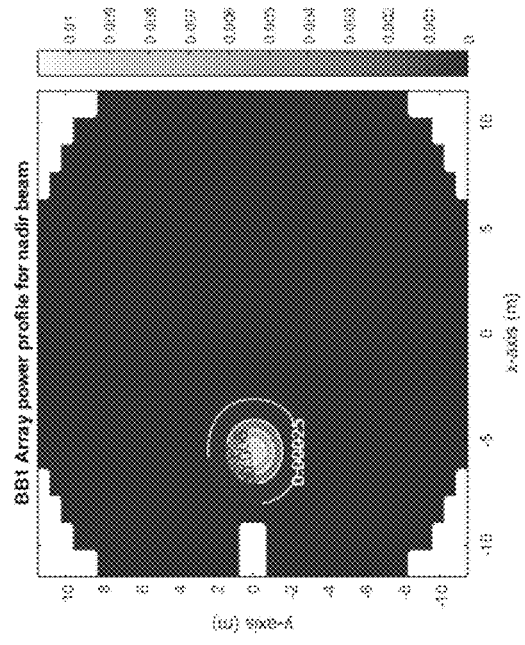
FIG. 10A illustrates array power profile for Nadir Beam (90° ground elevation).
Figure 10C:
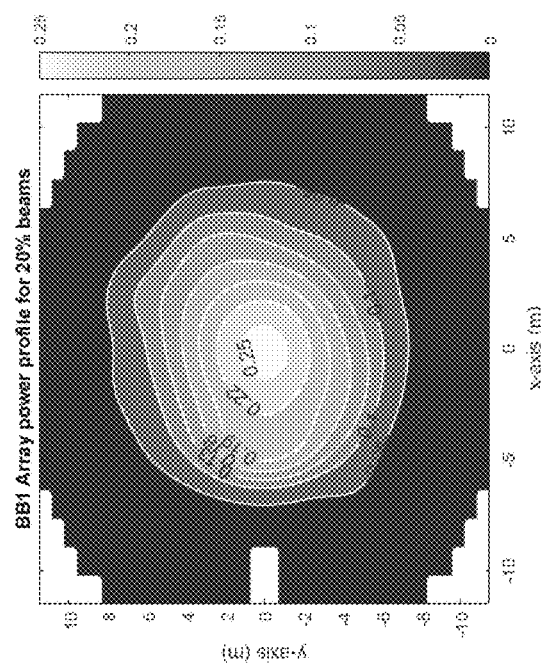
FIG. 10C illustrates array power profile for 20% active beams in FOV.

Not all array apertures have a simple analytical solution. In general, an exhaustive search may be done or performed to find the minimum (or reduced) PAPR. If there is a-priori known element that has peak power (e.g., the centroid), as is usually the case, then a beam-by-beam search is possible and may be performed, which greatly simplifies the search. FIG. 10A to 11D show the power contours of useful overall aperture examples, for the antenna elements in the array, for nadir, edge beam, 20% active beam in the FoV and 100% active beams in the FoV (where taper values for each beam are normalized such that the sum of taper square values equal to 1—i.e., $\Sigma(T_\alpha(x,y)^2)=1$). In this case, the element at the centroid of the array has the highest power; a simplified search can be used. FIG. 10A illustrates array power profile for Nadir beam (90° ground elevation), where worst-case power per element is equal to 0.0108 W, and PAPR (in sub-aperture) is equal to 8 dB. FIG. 10B illustrates array power profile for edge beam (20° ground elevation), where worst-case power per element is equal to 0.0027 W, and PAPR (in sub-aperture) is equal to 11.23 dB. FIG. 10C illustrates array power profile for 20% active beams in FOV, where there are 610 active beams in FoV, with peak element power of 261 mW and PAPR of 6.26 dB. FIG. 10D illustrates array power profile for 100% active beams in FOV, where there are 3048 Beams in FOV, and worst case power per element is equal to 1.35 W, and PAPR (over full aperture) is equal to 6.4 dB.

One objective of the present disclosure is, for the downlink, to minimize or reduce peak to average power (PAPR). This minimizes or reduce (1) The maximum-power rating for an element in the array, and/or losses due to transferring solar power from an edge of an array structure to the center of the array structure.

As shown in the example of FIG. 10A, for close to nadir, only a small aperture is needed, not the entire aperture. In the example of FIG. 10D, all elements' powers in sub-apertures are added to corresponding elements' power in other sub-apertures; in this case, the centroid element carries maximum power, and that power can be minimized by selection of sub-apertures for each beam.

There can be a different taper for each geographic area, and the system can be adaptive/dynamic. A radio survey measures the electromagnetic field of Earth. Accordingly, at a first step, a frequent radio surveys are performed by satellite based on near-nadir geographical area (e.g., a cell) and time of day. The reason a near-nadir cell is selected is because interference from other areas can be suppressed to, say, −55 dB, by using a fixed Dolph-Chebyshev taper. The radio-survey is completed for other cells in the geographic area when those cells are near-nadir to the satellite. At a second step, the survey is applied (in terms of the near-far interference scenario for a given beam and, thereby, taper selection). And at a third step, the selected tapers are implemented for that beam; this process (step 2 and 3) is repeated until all beams in the FOV have tapers assigned to them.

Figure 11:
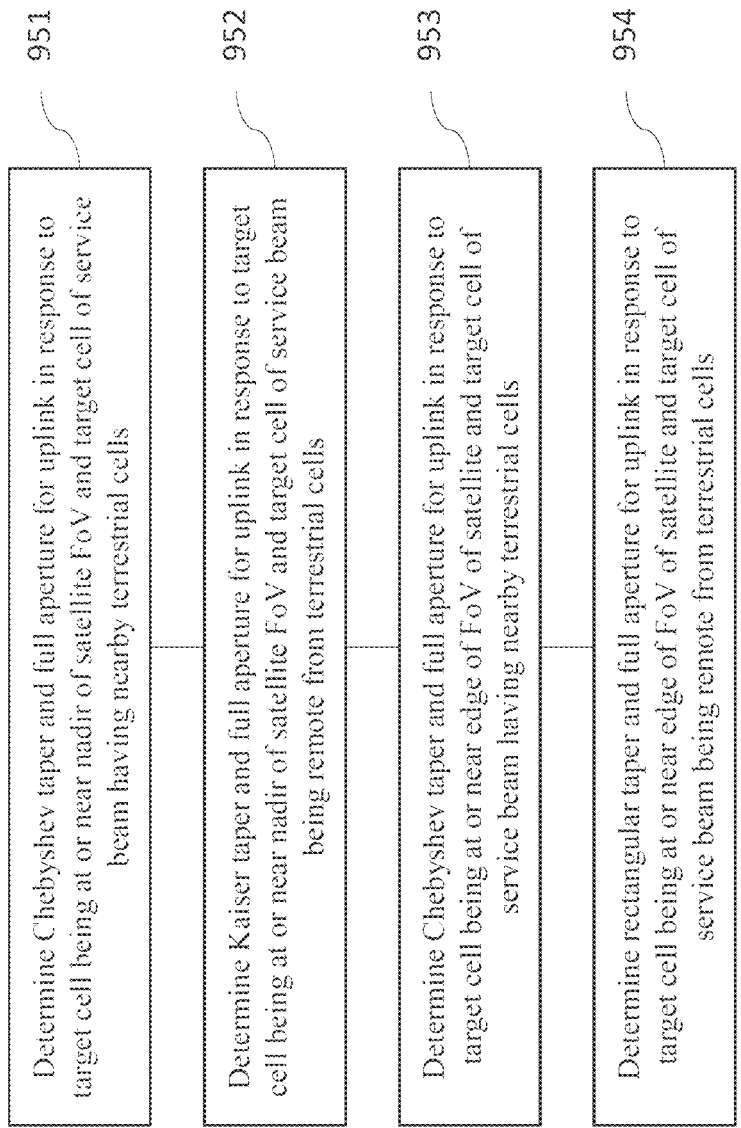
FIG. 11 illustrates a flowchart of applying taper and selecting aperture for uplink according to disclosed embodiments.

In some examples, the processing device 111 of the controller satellite 110 can determine taper and/or select aperture (such as sub-aperture or full aperture) according to location of target cell of service beam in FoV and/or whether target cell of service beam is nearby or remote from terrestrial cells, and can distribute determined taper and/or selected aperture to the satellite phased array 120. FIG. 11 illustrates a flowchart of determining (or selecting) taper and aperture for uplink according to disclosed embodiments, which include Steps 951 to 954. In certain examples, the processing device 111 of the controller satellite 110 may be configured to determine Chebyshev taper and full aperture for uplink in response to target cell being at or near nadir of satellite FoV and target cell of service beam having nearby terrestrial cells (Step 951 of FIG. 11); to determine Kaiser taper and full aperture for uplink in response to target cell being at or near nadir of satellite FoV and target cell of service beam being remote from terrestrial cells (Step 952); to determine Chebyshev taper and full aperture for uplink in response to target cell being at or near edge of FoV of satellite and target cell of service beam having nearby terrestrial cells (Step 953); and/or to determine rectangular taper and full aperture for uplink in response to target cell being at or near edge of FoV of satellite and target cell of service beam being remote from terrestrial cells (Step 954). In some examples, nearby interference (or nearby interferers) corresponds to a distance of less than 600 km with respect to the target cell of service beam; and remote interference (or remote interferers) corresponds to a distance of equal to or greater than 1200 km with respect to the target cell of service beam.

Chebyshev taper suppresses the stopband the same (whether cells are close by or far away). Kaiser taper, on the other hand, has greater suppression far away than nearby. In some examples, Chebyshev taper can be selected when interference generating cells are nearby, and Kaiser can be selected when interference generating cells are far away.

Figure 12:
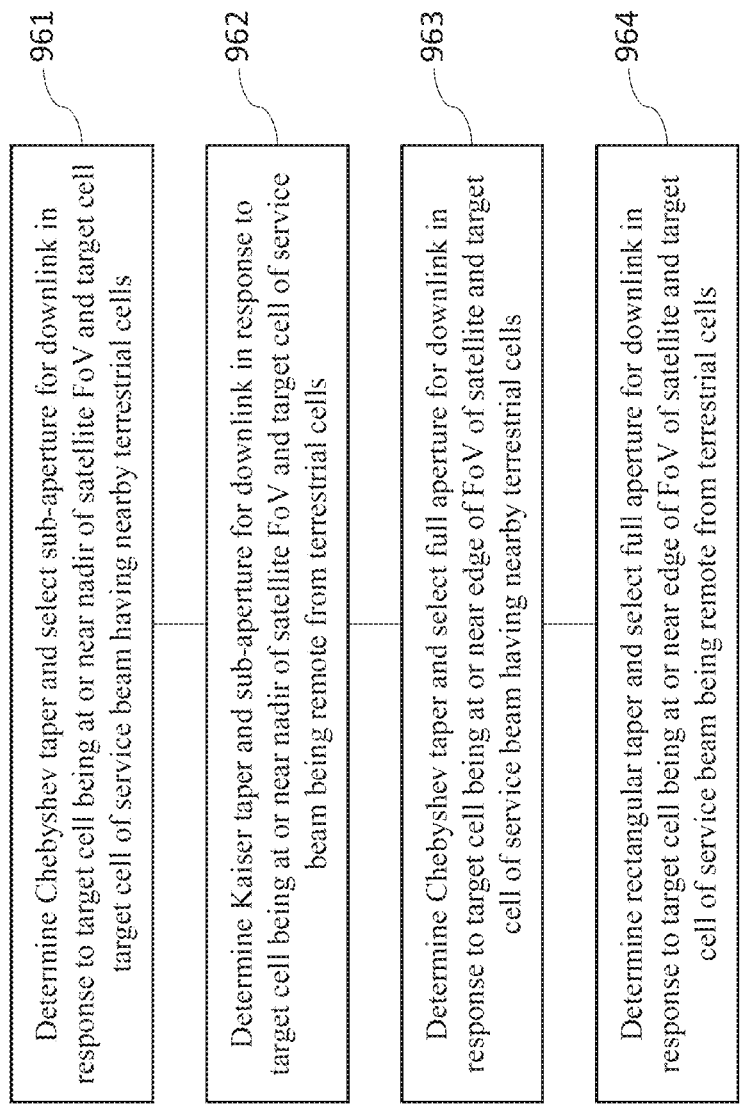
FIG. 12 illustrates a flowchart of selecting taper and aperture for downlink according to disclosed embodiments.

FIG. 12 illustrates a flowchart of determining (or selecting) taper and aperture for downlink according to disclosed embodiments, which includes Steps 961 to 964. In certain examples, the processing device 111 of the controller satellite 110 may be configured Determine Chebyshev taper and select sub-aperture for downlink in response to target cell being at or near nadir of satellite FoV and target cell of service beam having nearby terrestrial cells (Step 961 of FIG. 12); determine Kaiser taper and sub-aperture for downlink in response to target cell being at or near nadir of satellite FoV and target cell of service beam being remote from terrestrial cells (Step 962); to determine Chebyshev taper and select full aperture for downlink in response to target cell being at or near edge of FoV of satellite and target cell of service beam having nearby terrestrial cells (Step 963); and/or to determine rectangular taper and select full aperture for downlink in response to target cell being at or near edge of FoV of satellite and target cell of service beam being remote from terrestrial cells (Step 964).

In some examples, for each uplink beam or downlink beam, the taper may be determined and aperture may be selected according to the service beam type and relative position between satellite and service cell (such as listed in Tables 1 and 2) by the processing device 111 of the controller satellite 110, and the processing device 111 of the controller satellite 110 can distribute the determined taper and selected aperture (or sub-aperture) to the satellite phased array 120. As a result, tapers chosen are adaptive to the interference scenario on the Earth encountered by an orbiting satellite.

The present disclosure provides a satellite communication system including a planar phased antenna array having a field of view (FoV) and configured to communicate with a plurality of cells in the FoV via a plurality of uplink beams, each of the plurality of uplink beams being associated with one of the plurality of cells; and a control satellite having a processing device configured to generate the plurality of uplink beams, adaptively determine an uplink beam taper for each uplink beam of the plurality of uplink beams and distribute, to the phased array, the uplink beam taper for each uplink beam of the plurality of uplink beams.

In some examples, the uplink beam taper is adapted (or determined) based on a distance between a target cell and a source of interference.

In certain examples, the source of interference is a network of terrestrial cells.

In various examples, the uplink beam taper can be determined by the processing device 111 of the control satellite 110, by determining the interference based on each of multiple types of beam tapers (such as Chebyshev taper, Kaiser taper), and selecting the uplink beam taper that has the lowest or lower interference.

In one example, when the target cell is at or near a nadir in the FoV, the processing device of the control satellite determines a first interference from (based on) a Chebyshev taper and a second interference from (based on) a Kaiser taper, and apply the Chebyshev taper if the first interference is lower than the second interference, and apply the Kaiser taper if the first interference is equal to or higher than the second interference.

In another example, when the target cell is at or near a nadir in the FoV, the processing device of the control satellite determines a first interference from a Chebyshev taper and a second interference from a Kaiser taper, and select the Chebyshev taper or the Kaiser taper based on which one of the first interference and the second interference is lower.

In some examples, the satellite communication system of claim 1, wherein when the target cell is at or near an edge of the FoV, the processing device of the control satellite determines a first interference from a Chebyshev taper and a second interference from a rectangular taper, and apply the Chebyshev taper if the first interference is lower than the second interference, and apply the rectangular taper if the first interference is equal to or higher than the second interference.

In some examples, the processing device of the control satellite applies a full aperture for each uplink beam of the plurality of uplink beams.

In certain examples, the processing device of the control satellite is configured to generate a plurality of downlink beams via the phased antenna array by determining a downlink sub-aperture and a downlink beam taper for each downlink beam of the plurality of downlink beams.

In another examples, the phased antenna array include a plurality of antenna elements; and the phased antenna array is configured to apply the determined downlink sub-aperture to reduce peak-to-average-power (PAPR) of the plurality of antenna elements.

In some examples, a satellite communication system includes a planar phased antenna array having a plurality of antenna elements, a field of view (FoV) and an aperture, and configured to communicate with a plurality of cells in the FoV via a plurality of downlink beams, each of the plurality of downlink beams being associated with one of the plurality of cells; and a control satellite having a processing device configured to: generate the plurality of downlink beams, select a downlink sub-aperture for each of the plurality of downlink beams, each selected downlink sub-aperture being a collection of contiguous antenna elements of the plurality of antenna elements in the planar phased antenna array; determine a downlink beam taper for each downlink beam of the plurality of downlink beams; and distribute, to the phased array, the selected downlink sub-aperture and the downlink beam taper for each downlink beam of the plurality of downlink beams.

In certain examples, the processing device of the control satellite is configured to select the downlink sub-aperture (e.g., sub-aperture 913, 914, 915 of FIG. 9) substantially tangential to the overall aperture (e.g., 912), substantially orthogonal to the direction of the target cell, to reduce peak-to-average-power (PAPR) of the plurality of elements. The phrase "substantially orthogonal" means, when the vector from the satellite to the cell is projected on the planar antenna array, then the direction of the sub-aperture center selection (such as direction from O1 to O2 in FIG. 9) is approximately 90° to the direction of the projected vector (referred to earlier) (such as east or west in the FIG. 9). In certain examples, for arbitrary-shape overall aperture, this PAPR reduction can employ a search procedure to select each downlink beam's sub-aperture; when the peak power is associated with the antenna element at a centroid of the overall aperture, the search procedure may be done on a beam-by-beam basis; and the search procedure involves determining a sub-aperture position in the overall aperture that has a lowest contribution to peak power.

In some examples, the processing device of the control satellite can perform a search procedure to select each downlink beam's sub-aperture; and when the peak power is associated with the antenna element at a centroid of the overall aperture, the processing device of the control satellite can perform the search procedure on a beam-by-beam basis; and the processing device of the control satellite can perform the search procedure by determining a sub-aperture position in the overall aperture that has a lowest contribution to peak power, on a beam-by-beam basis.

In some examples, the processing device of the control satellite determines a first interference from (based on) a Chebyshev taper, a second interference from (based on) a Kaiser taper, and a third interference from (based on) a rectangular taper, and applies the Chebyshev taper if the first interference is lower than the second interference and the third interference, applies the Kaiser taper if the second interference is lower than the first interference and the third interference, and applies the rectangular taper if the third interference is lower than the first interference and the second interference.

In certain examples, the processing device of the control satellite determines a first interference from (based on) a Chebyshev taper, a second interference from (based on) a Kaiser taper, and a third interference from (based on) a rectangular taper, and selects the Chebyshev taper or the Kaiser taper or the rectangular interference based on which one of the first interference, second interference, and third interference is lowest.

The system and method of the present invention may include operation by one or more processing devices, such as the processing devices 136 of antenna assemblies 130 and/or the processing device 111 of the control satellite 110. The processing device can be for example, a micro-processor. The processing devices can be used in combination with other suitable components, such as memory or storage device, wireless module. The information may be stored on a memory or storage device, which can be located at or in communication with the processing device.

The invention claimed is:

1. A satellite communication system, comprising:
   a planar phased antenna array having a field of view (FoV) and configured to communicate with a plurality of cells in the FoV via a plurality of uplink beams, each of the plurality of uplink beams being associated with one of the plurality of cells; and
   a control satellite having a processing device configured for the plurality of uplink beams that adaptively determine an uplink beam taper for each uplink beam of the plurality of uplink beams and distribute, to the phased array, the uplink beam taper for each uplink beam of the plurality of uplink beams.

2. The satellite communication system of claim 1, wherein the uplink beam taper is adapted based on a distance between a target cell and a source of interference.

3. The satellite communication system of claim 2, wherein the source of interference is a network of terrestrial cells.

4. The satellite communication system of claim 2, wherein the uplink beam taper is a Chebyshev taper in response to the target cell being nearby the network of terrestrial cells.

5. The satellite communication system of claim 1, wherein the processing device of the control satellite determines a first interference from a Chebyshev taper and a second interference from a Kaiser taper, and apply the Chebyshev taper if the first interference is lower than the second interference, and apply the Kaiser taper if the first interference is equal to or higher than the second interference.

6. The satellite communication system of claim 1, wherein the processing device of the control satellite determines a first interference from a Chebyshev taper and a second interference from a Kaiser taper, and select the Chebyshev taper or the Kaiser taper based on which one of the first interference and the second interference is lower.

7. The satellite communication system of claim 1, wherein the processing device of the control satellite determines a first interference from a Chebyshev taper and a second interference from a rectangular taper, and apply the Chebyshev taper if the first interference is lower than the second interference, and apply the rectangular taper if the first interference is equal to or higher than the second interference.

8. The satellite communication system of claim 1, wherein the processing device of the control satellite determines a first interference from a Chebyshev taper, a second interference from a Kaiser taper, and a third interference from a rectangular taper, and applies the Chebyshev taper if the first interference is lower than the second interference and the third interference, applies the Kaiser taper if the second interference is lower than the first interference and the third interference, and applies the rectangular taper if the third interference is lower than the first interference and the second interference.

9. The satellite communication system of claim 1, wherein the processing device of the control satellite determines a first interference from a Chebyshev taper, a second interference from a Kaiser taper, and a third interference from a rectangular taper, and selects the Chebyshev taper or the Kaiser taper or the rectangular interference based on which one of the first interference, second interference, and third interference is lowest.

10. The satellite communication system of claim 2, wherein when the target is at or near a nadir in the FoV and when the target cell is nearby to the source of interference, the processing device of the control satellite applies a Chebyshev taper.

11. The satellite communication system of claim 2, wherein when the target is at or near a nadir in the FoV and when the target cell is remote from the source of interference, the processing device of the control satellite applies a Kaiser taper.

12. The satellite communication system of claim 2, wherein when the target is at or near an edge of the FoV and when the target cell is nearby to the source of interference, the processing device of the control satellite applies a Chebyshev taper.

13. The satellite communication system of claim 2, wherein when the target is at or near an edge of the FoV and when the target cell is remote from the source of interference, the processing device of the control satellite applies a rectangular taper.

14. The satellite communication system of claim 2, wherein the processing device of the control satellite applies a full aperture for each uplink beam of the plurality of uplink beams.

15. The communication system of claim 13, wherein:
the phased antenna array includes a plurality of antenna elements; and
the phased antenna array is configured to apply the determined downlink sub-aperture to reduce peak-to-average-power (PAPR) of the plurality of antenna elements.

16. A satellite communication system, comprising:
a planar phased antenna array having a plurality of antenna elements, a field of view (FoV) and an aperture, and configured to communicate with a plurality of cells in the FoV via a plurality of downlink beams, each of the plurality of downlink beams being associated with one of the plurality of cells; and
a control satellite having a processing device configured to:
select a downlink sub-aperture for each of the plurality of downlink beams, each selected downlink sub-aperture being a collection of contiguous antenna elements of the plurality of antenna elements in the planar phased antenna array;
determine a downlink beam taper for each downlink beam of the plurality of downlink beams; and
distribute, to the phased array, the selected downlink sub-aperture and the downlink beam taper for each downlink beam of the plurality of downlink beams.

17. The communication system of claim 16, wherein:
the processing device is configured to select the downlink sub-aperture substantially tangential to the overall aperture, substantially orthogonal to the direction of the target cell, in order to reduce peak-to-average-power (PAPR) of the plurality of elements;
for arbitrary-shape overall aperture, this PAPR reduction employs a search procedure to select each downlink beam's sub-aperture;
when the peak power is associated with the antenna element at a centroid of the overall aperture, the search procedure may be done on a beam-by-beam basis; and
the search procedure involves determining a sub-aperture position in the overall aperture that has a lowest contribution to peak power.

* * * * *